United States Patent
Tabayashi

[11] Patent Number: 5,122,027
[45] Date of Patent: Jun. 16, 1992

[54] CARRIER FOR CONTAINERS

[75] Inventor: Yoshikazu Tabayashi, Osaka, Japan

[73] Assignee: Osaka Taiyu Co., Ltd., Osaka, Japan

[21] Appl. No.: 710,081

[22] Filed: Jun. 4, 1991

[30] Foreign Application Priority Data

Jun. 7, 1990 [JP] Japan .................... 2-150550

[51] Int. Cl.$^5$ .................................. B60P 3/00
[52] U.S. Cl. ........................... 414/622; 414/490; 414/454
[58] Field of Search ............... 414/618, 619, 620, 621, 414/622, 626, 623, 490, 444, 445, 450, 452, 453, 454, 455; 294/98; 254/2 R, 423, 93 VA, 93 R

[56] References Cited

U.S. PATENT DOCUMENTS

| | | | |
|---|---|---|---|
| 2,635,775 | 4/1953 | Ernst. | |
| 2,905,347 | 9/1959 | Hopfeld. | |
| 4,257,729 | 3/1981 | Morissette | 414/622 X |
| 4,741,659 | 5/1988 | Berg | 414/622 X |
| 4,981,412 | 1/1991 | Hawkins | 414/490 |

FOREIGN PATENT DOCUMENTS 2531370  1/1977  Fed. Rep. of Germany.

OTHER PUBLICATIONS

Liftmatic HTXE-500 Drum Handling Truck (Feb. 6, 1991).

Primary Examiner—Frank E. Werner
Attorney, Agent, or Firm—Arnold B. Silverman; Suzanne Kikel

[57] ABSTRACT

A carrier comprising a lift bar provided on the body of the carrier and movable upward and downward, a connecting member pivotably connected between an upwardly driving cylinder device and the lift bar, an upper claw provided on the connecting member, and a lower claw provided on the lift bar and cooperative with the upper claw for holding the upper rim of a container. The load of the container acting on the lower claw pulls down the upper claw for the two claws to clamp the container upper rim to transport the container as lifted.

5 Claims, 8 Drawing Sheets

CARRIER FOR CONTAINERS

FIELD OF THE INVENTION

The present invention relates to a carrier for large containers such as drums, and more particularly to a wheeled carrier for transporting containers as raised with the upper rim of the container clamped by an upper claw and a lower claw.

BACKGROUND OF THE INVENTION

Such carriers are already known which include, for example, those shown in FIGS. 6 and 7.

The carrier shown in FIG. 6 will be described. The illustrated carrier comprises a body 1, a post 2 provided upright thereon, and a lift bar 4 disposed inside the post 2 and movable upward and downward. The lift bar 4 has a lower claw 5 and an upper claw 7 each pivoted at an intermediate portion thereof to the bar upper end. The two claws 5, 7 are interconnected, each at its one end, pivotably by a link 71. A cylinder device 3 is mounted on the carrier body 1 and has a piston rod 32 connected to the lift bar 4.

When the lift bar 4 is raised with the upper rim of a drum 9 held between the lower claw 5 and the upper claw 7, the load acting on the lower claw 5 causes the link 71 to move down the other end of the upper claw 7, i.e., the forward end thereof, permitting the two claws to tightly clamp the drum rim. The carrier body 1 is further provided with a contact portion 41 for preventing the drum from inclining forward by coming into contact with the trunk of the drum 9 when the drum 9 is lifted.

With the carrier described above, the contact portion 41 is fixed to the carrier body 1, so that the drum 9 is not liftable to a level at which the lower rim of the drum is positioned above the contact portion 41. Consequently, the carrier is unable to place the drum on a considerably high table.

Accordingly, carriers are proposed wherein the contact portion 41 is movable to varying levels like the one shown in FIG. 7. The illustrated carrier has a lift bar 4 connected to its body 1 by parallel links 23, 23 and provided with a lower claw 5 and an upper claw 7 like the foregoing carrier and with a lifting cylinder device 3 connected thereto.

With this carrier, however, the lift bar 4 moves forward or rearward when moving upward or downward since the lift bar 4 is supported by the parallel links 23, 23. This produces a difference between the position where the drum is lifted and the position where the drum is placed on the ground. Accordingly it is difficult to place four drums 9 on a pallet 8 without allowing any portion of the drum to project beyond the pallet as seen in FIG. 4. In the case where drums are transported as placed on pallets into a warehouse by an automated system, the drum 9, if partly projecting from the pallet 8, will actuate a safety circuit to stop the automatic operation. It is therefore the practice to manually push the projecting drum 9 to eliminate the projection. This requires labor.

Further when the drum 9 is lifted, a lower portion of the drum bears on the contact portion 41. At this time, a reaction F acts on the contact portion (see FIG. 8A). Assuming that the drum has a weight W, diameter D and height h, the reaction F is given by $F=(D/2\times W)/h$ and similarly acts on the clamping portions of the lower claw 5 and the upper claw 7. In the case of the conventional carriers shown in FIGS. 6 and 7, only the lift bar 4 bears the reaction F acting on the clamp portions, with the result that the reaction F acts as it is on the lift bar 4 as a bending moment. The lift bar 4 therefore needs to have rigidity to withstand this bending moment.

The present invention provides a carrier which is free of the above problems.

SUMMARY OF THE INVENTION

An object of the present invention is to provide a carrier for containers which is adapted to lift the container to a higher level.

Another object of the present invention is to provide a carrier wherein the bending moment on the lift bar is diminished to make the lift bar lightweight and to render containers liftable rapidly.

The present invention provides a carrier for containers which comprises a body, a hollow post provided upright on the body and having a vertical groove in its front wall, a cylinder device having a cylinder and a piston rod, the cylinder being attached at its lower end to the carrier body and disposed inside the post, a lift bar upwardly and downwardly movably disposed in proximity to the outer surface of the front wall of the post and provided at its lower portion with a contact portion adapted for contact with the trunk of the container to be transported and roller means rollable in contact with the outer surface of the post front wall, a connecting member pivotably connected between the piston rod of the cylinder device and the upper end of the lift bar, and clamp means comprising a first clamp element projecting from the upper portion of the lift bar and a second clamp element provided on the forward end of the connecting member, the first and second clamp elements being cooperative to clamp the upper rim of the container.

BRIEF DESCRIPTION OF THE DRAWINGS

FIGS. 9A and 9B are diagrams for illustrating the connecting member as shifted by manually raising the

DESCRIPTION OF THE PREFERRED EMBODIMENTS

Figure 1:
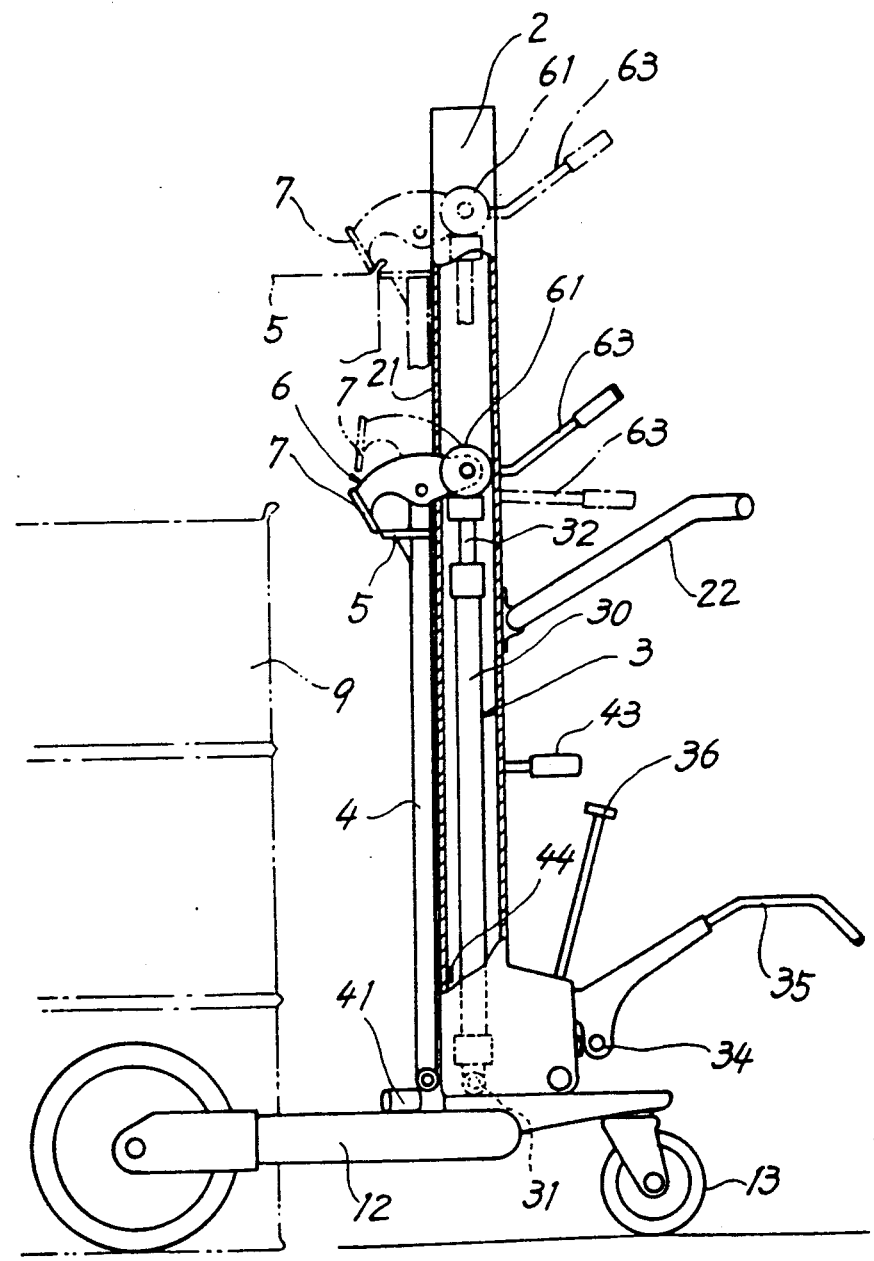
FIG. 1 is a view partly in section and showing a container carrier embodying the invention.
Figure 2:
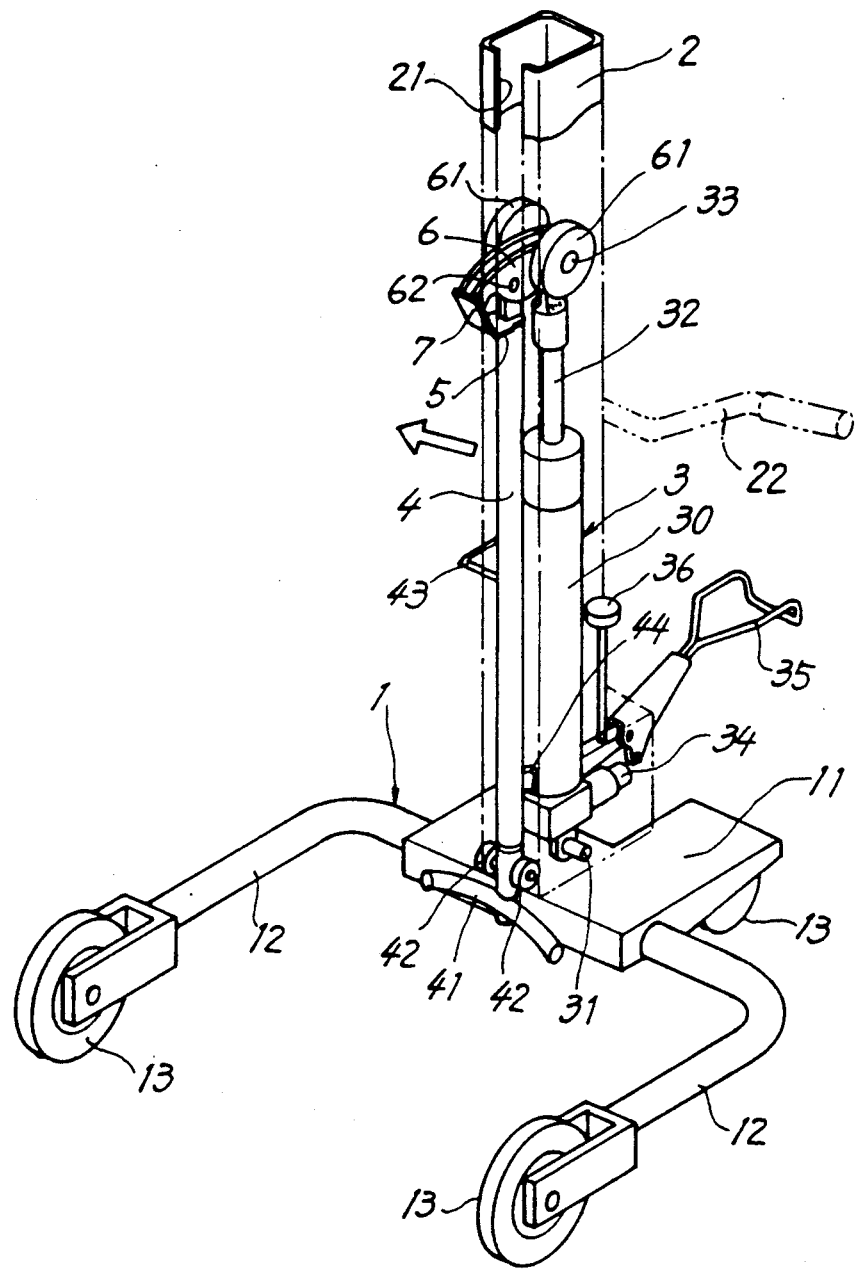
FIG. 2 is a perspective view of the container carrier of the invention.
Figure 2A:
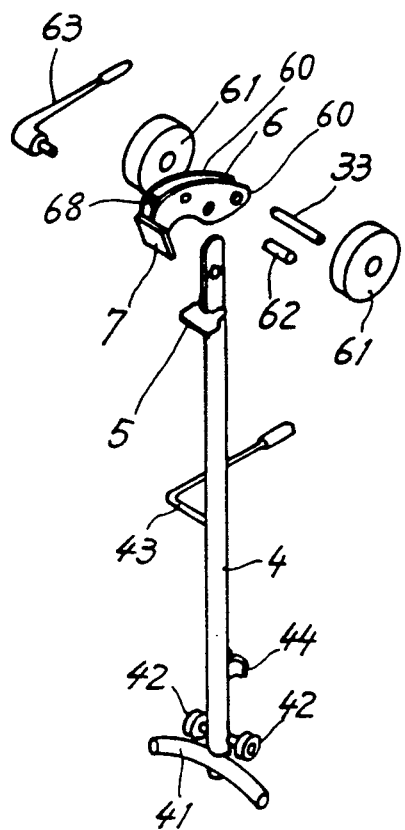
FIG. 2A is an exploded perspective view of a lift bar and a connecting member assembly.

With reference to FIGS. 1 and 2, a carrier body 1 comprises a base 11, and generally L-shaped arms 12, 12 extending from the respective opposite sides of the base 11 and spaced apart by a distance permitting a drum 9 to advance into the body. The forward ends of the arms 12, 12 and the base 11 are each provided with a wheel 13.

A hollow post 2 having a rectangular cross section extends vertically upward from the base 11. A vertical groove 21 is formed in the post 2 through its front wall and extends approximately over the entire length of the post. A pushing handle 22 extends from the rear wall of the post 2.

Figure 5:
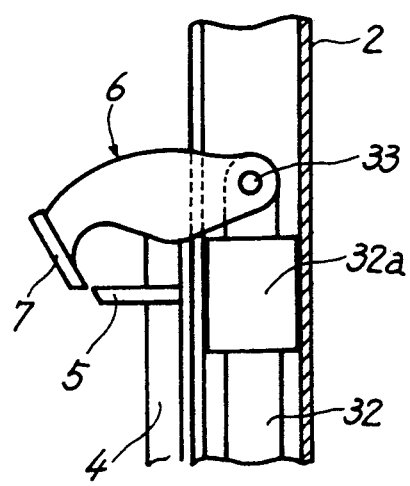
FIG. 5 is a diagram showing a mode of connecting the connecting member to a piston rod.
Figure 6:
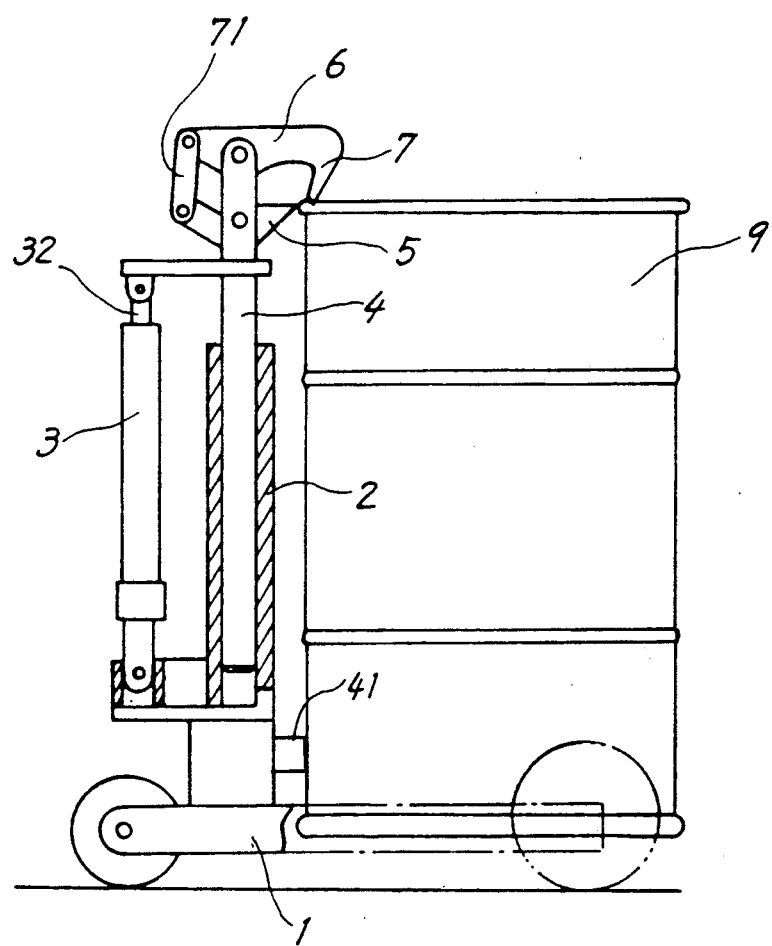
FIGS. 6 and 7 are views showing conventional container carriers.
Figure 7:
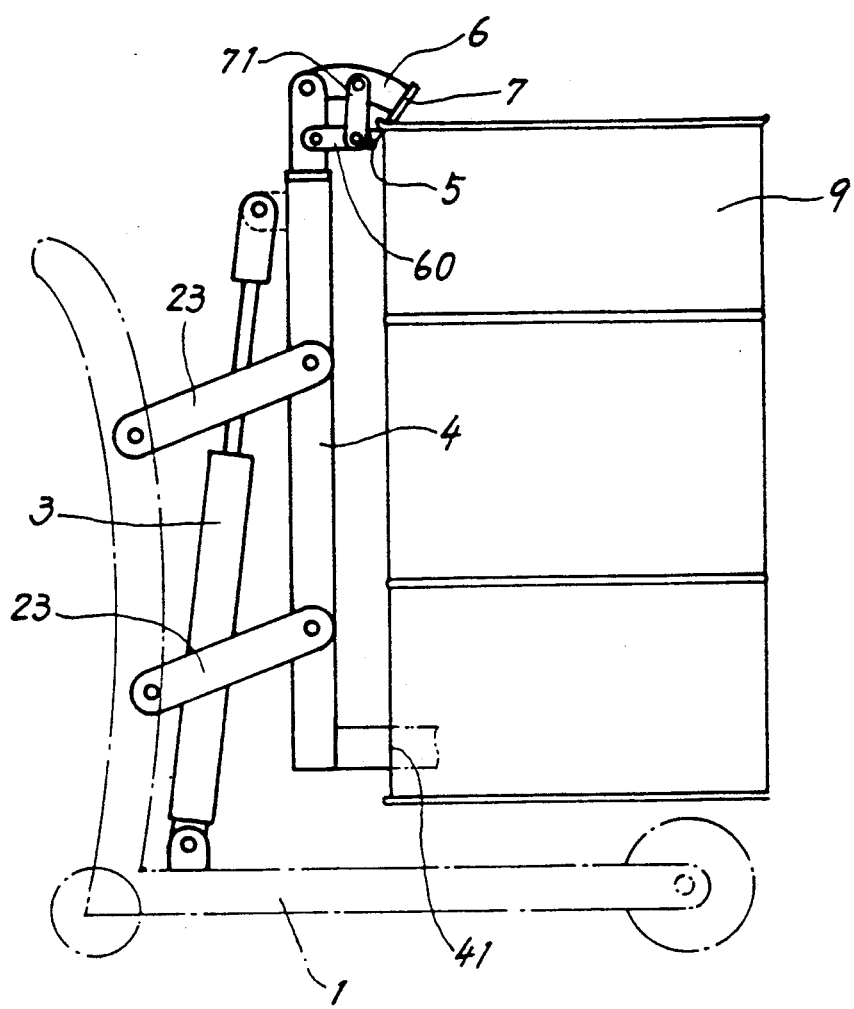

A cylinder device 3 comprising a cylinder 30 and a piston rod 32 extending upward therefrom is disposed inside the post 2. The piston rod 32 may be provided with guide rollers 61 rollable in contact with the inner surface of the front wall of the post 2. Alternatively, as seen in FIG. 5, the piston rod 32 may be formed with an enlarged portion 32a having a diameter slightly smaller than the inside dimension of the post 2 and slidable in contact with the inner surface of the post.

Figure 3:
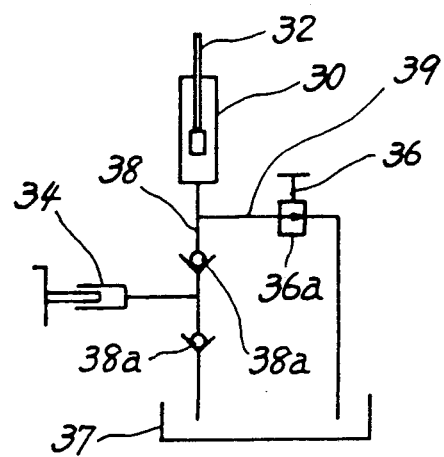
FIG. 3 is a circuit diagram of a hydraulic system.

FIG. 3 shows a circuit diagram of a hydraulic system connected to the cylinder 30. With reference to FIG. 3, an oil tank 37 is connected to the cylinder 30 by a channel 38, which is provided with two check valves 38a, 38a for permitting oil to flow only from the tank 37 to the cylinder 30. Between the two check valves 38a, 38a, a hydraulic pump 34 is connected to the channel 38. A discharge channel 39 is connected to the channel 38 between the cylinder 30 and the downstream check valve 38a. A pressure relief valve 36a is provided at an intermediate portion of the discharge channel 39 and has a relief knob 36. The hydraulic pump 34 has a pedal 35 coupled thereto (see FIG. 2).

Again, with reference to FIGS. 1 and 2, a connecting member 6 is pivotably connected between the upper end of the piston rod 32 of the cylinder device 3 and the upper end of a lift bar 4 (to be described below). The connecting member 6 comprises a pair of connecting plates 60, 60 opposed to each other and is pivotally movable in a vertical plane through the center of the vertical groove 21 of the post 2. The connecting member 6 extends forward beyond the portion thereof pivoted to the lift bar 4 and has an upper claw 7 fixed to the extended end. The upper claw 7 has a lower end slightly inclined rearward. A stopper 68 provided between the connecting plates 60, 60 is positioned slightly to the front of a pivot 62 (to be described below). The connecting member 6 has a handle 63 for raising the upper claw 7.

The piston rod 32 is connected to the connecting member 6 by a pivot 33. The guide rollers 61 can be rotatably mounted on the respective ends of the pivot 33.

With the embodiment wherein the upper end portion of the cylinder rod 32 is slidable in contact with the inner surface of the post 2 as seen in FIG. 5, the lower end of the cylinder 30 of the cylinder device 3 is preferably fixed to the body 1. However, in the case of the embodiment wherein the cylinder rod 32 is provided with the guide rollers 61 as shown in FIGS. 1 and 2, it is desired that the lower end of the cylinder 30 be supported by a pivot 31 forwardly and rearwardly movably because this obviates the likelihood that when the drum 9 is lifted causing the rollers 61 to bear on the inner surface of the post front wall, the movement will directly exert an objectionable force on the cylinder 30 even if the outside diameter of the rollers 61 is considerably smaller than the inside dimension of the post 2.

The lift bar 4 is disposed in front of the post 2 in proximity to the outer surface of the post front wall. The lift bar 4 is connected at its upper end to the connecting member 6 by the pivot 62 and has a free lower end.

The lift bar 4 has a lower claw 5 opposed to the upper claw 7 and projecting from its upper portion approximately horizontally forward. The upper and lower claws are cooperative with each other to serve as clamp means. The lift bar 4 has a handle 43 projecting approximately from its midportion for manually raising the lift bar. The bar 4 has a circular-arc contact portion 41 projecting from its lower end and adapted to come into contact with the trunk of the drum 9, and rollably carries a pair of rollers 42, 42 positioned in the vicinity of the contact portion 41 and in contact with the outer surface of the post front wall. The lift bar 4 is further provided with a retaining member 44 projecting rearward from a lower portion thereof and adapted to contact the inner surface of the post front wall for restraining the lift bar 4 from moving forward.

When the hydraulic pump 34 is operated by the pedal 34, the cylinder device 3 functions, advancing the piston rod 32 and causing the connecting member 6 to pull the lift bar 4 upward.

When the lower claw 5 and the upper claw 7 are brought to a level corresponding to the height of the top of the upper rim of the drum 9, the upper claw handle 63 is manipulated to raise the upper claw 7, and the carrier is advanced toward the drum 9, allowing the upper rim of the drum 9 to advance into the space between the two claws.

When the cylinder device 3 is subsequently operated by the pedal 35, the load of the drum 9 acting on the lower claw 5 causes the connecting member 6 to pull down the upper claw 7, whereby the rim of the drum is tightly clamped by the two claws 5, 7. In this state, the drum is lifted and can be transported to the desired location.

The drum 9 can be lowered with its rim clamped by the claws 5, 7 by lowering the piston rod 32. Upon the drum 9 reaching the floor, the lower claw 5 is relieved of the load of the drum acting thereon, so that the upper claw 7 is opened to release the drum rim from the two claws.

Figure 8A:
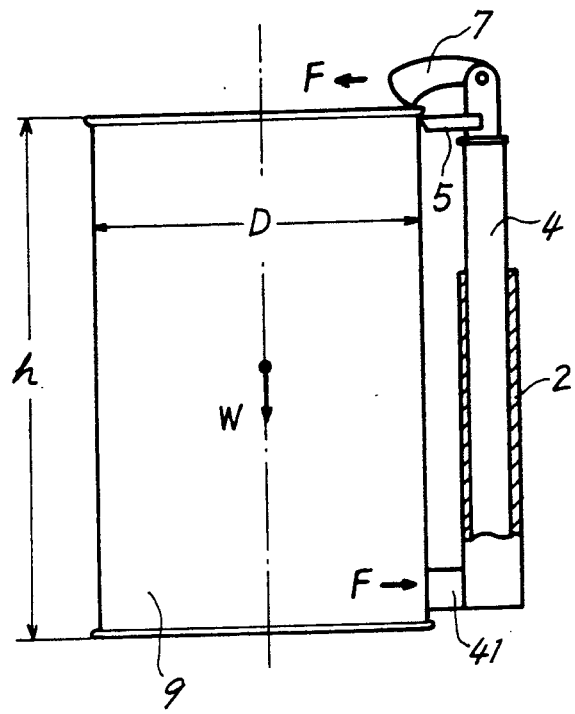
FIG. 8A is a diagram illustrating a reaction acting on the lift bar of the conventional container carrier.
Figure 8B:
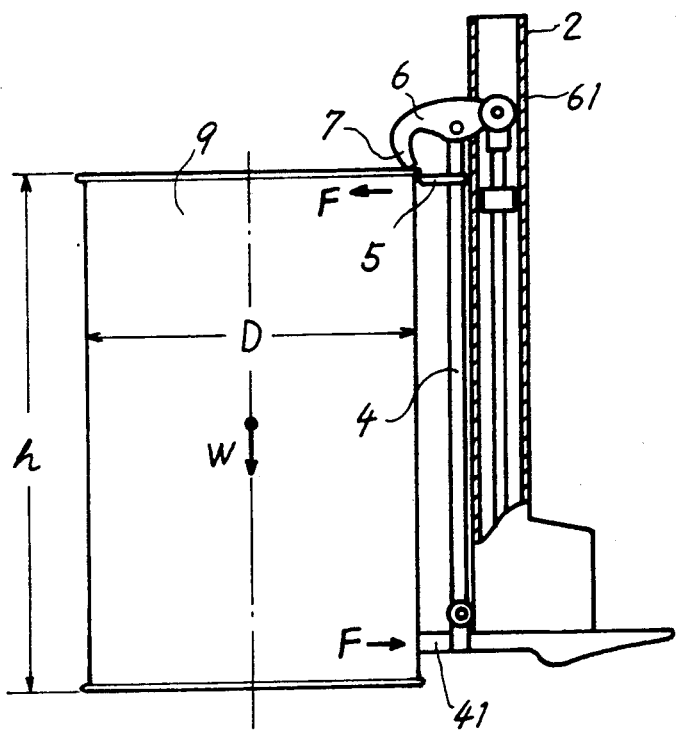
FIG. 8B is a diagram illustrating a reaction acting on the lift bar of the container carrier of the invention.

In the case of the carrier of the present invention, the connecting member 6 is pivotably connected between the upper end of the piston rod 32 of the cylinder device 3 and the upper end of the lift bar 4 as already described. For example in the case of the embodiment wherein the guide rollers 61 are rotatably mounted on the connecting member, the reaction F acting on the clamp means when the drum 9 is lifted is borne by both the lift bar 4 and the guide rollers 61 as shown in FIG. 8B, so that the bending moment acting on the lift bar 4 is much smaller than is the case with the conventional carrier. This is the same with the embodiment shown in FIG. 5. Consequently, the lift bar 4 does not require great rigidity and can be lightweight. Thus, the lift bar 4 inclusive of the clamp means can be up to about 4 kg for transporting drums weighing about 200 to 300 kg.

When a drum 9 as placed on a table having a considerable height is to be lowered, the work can be done rapidly in the following manner.

Figure 9A:
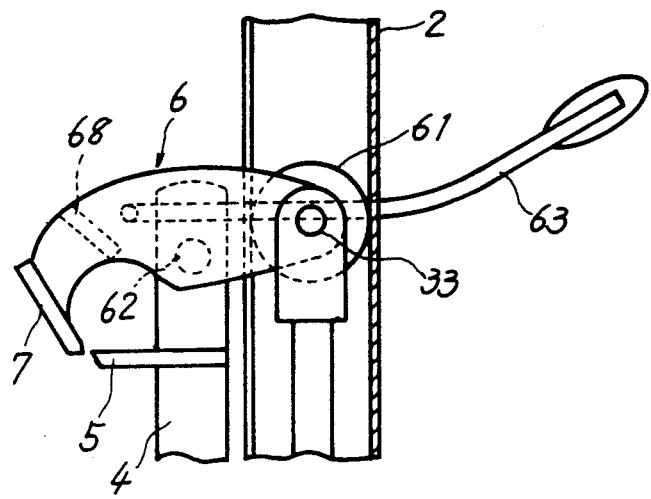
Figure 9B:
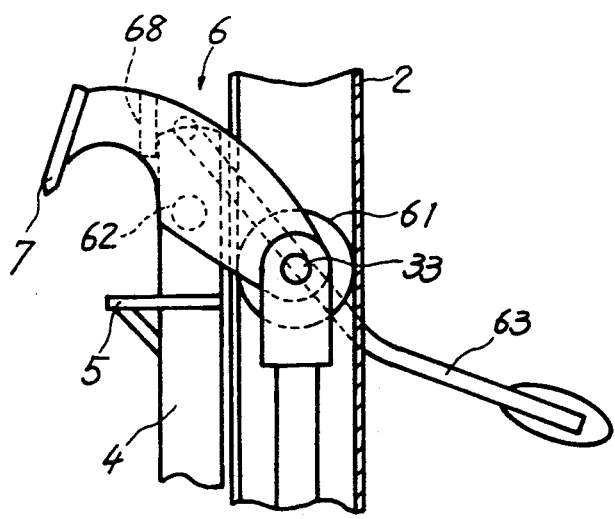

First, the handle 43 is raised to move the lift bar 4 upward from the state shown in FIG. 9A, whereby the connecting member 6 is moved about the pivot 33 to a position where the stopper 68 comes into contact approximately with the upper end of the lift bar 4 as seen in FIG. 9B. When the handle 43 is further raised in this state, the piston rod of the cylinder device 3 is also moved up by the connecting member 6. After the parts are thus raised to the desired level where the drum 9 to be clamped is positioned, the carrier is advanced toward the drum 9 as already stated. When the handle 43 is released from the hand, the upper claw 7 moves down, for the clamp means to hold the upper rim of the drum 9. When the cylinder device 3 is then operated by depressing the pedal 35, the drum 9 can be lifted as tightly clamped by the clamp means. In this way, the operation of the pump 34 with the pedal 35 can be initiated at the desired level. This serves to shorten the time required for moving the lift bar 4 upward and downward.

When the piston rod 32 of the cylinder device 3 is pulled up by further raising the lift bar 4 from the state of FIG. 9B in the foregoing operation, the oil is drawn through the channel 38 into the cylinder 30 from the tank 37 in the hydraulic system, and the piston rod 32 is held at the pulled-up position by the operation of the check valves 38a, 38a. This state is sustained unless the pressure relief value 36a is manipulated by the knob 36.

According to the present invention, the lift bar 4 can be made lightweight by diminishing the bending moment to be exerted on the bar 4. This renders the handle 43 very easy to raise.

Figure 4:
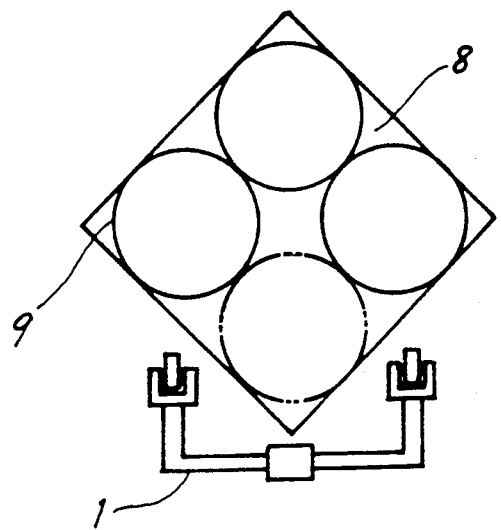
FIG. 4 is a plan view showing containers as placed on a pallet.

Furthermore, the lift bar 4 moves only straight vertically with the drum clamped, and does not move forward or rearward unlike the conventional carrier shown in FIG. 5. This makes it easy for the carrier to place drums 9 on the pallet 8 without any projection beyond the pallet as seen in FIG. 4.

The container to be transported by the carrier of the invention is not limited to the drum 9 but can be any container insofar as the container has an upper rim which can be held clamped by the lower claw 5 and the upper claw 7.

The present invention is not limited to the construction of the foregoing embodiments but can be modified variously within the scope thereof defined in the appended claims.

What is claimed is:

1. A container carrier comprising:
   a carrier body,
   a hollow post provided upright on the body and having a vertical groove therein through a front wall thereof,
   a cylinder device having a cylinder and a piston rod, the cylinder being attached at a lower end to the carrier body and disposed inside the post,
   a lift bar upwardly and downwardly movably disposed in proximity to an outer surface of the front wall of the post and provided at its lower portion with a contact portion adapted for contact with a trunk of the container to be transported and roller means rollable in contact with the outer surface of the post front wall,
   a connecting member pivotably connected between the piston rod of the cylinder device and an upper end of the lift bar, and
   clamp means comprising a first clamp element projecting from an upper portion of the lift bar and a second clamp element provided on a forward end of the connecting member, the first and second clamp elements being cooperative to clamp an upper rim of the container.

2. A carrier as defined in claim 1 wherein the piston rod is provided at an upper end with guide roller means rollable in contact with an inner surface of the post front wall.

3. A carrier as defined in claim 2 wherein the lower end of the cylinder is pivoted to the carrier body.

4. A carrier as defined in claim 1 wherein the cylinder has a hydraulic system connected thereto, and the hydraulic system comprises an oil tank, a channel connecting the oil tank to the cylinder, first and second check valves provided in the channel for permitting oil to flow only from the tank to the cylinder, a hydraulic pump interposed between the first and second check valves, a discharge channel communicating with the oil tank and connected to the channel between the cylinder and the downstream second check valve, a pressure relief valve provided in the discharge channel and a relief knob coupled to the relief valve.

5. A carrier as defined in claim 1 wherein the connecting member comprises a pair of connecting plates opposed to each other and connected to the lift bar by a pivot, and a stopper is provided between the connecting plates at a position slightly to a front portion of the pivot so as to come into contact with an upper end portion of the lift bar.

* * * * *